Oct. 7, 1969     G. KIPER     3,470,802
EXPOSURE CONTROL MECHANISM FOR PHOTOGRAPHIC CAMERAS
Filed Dec. 28, 1966
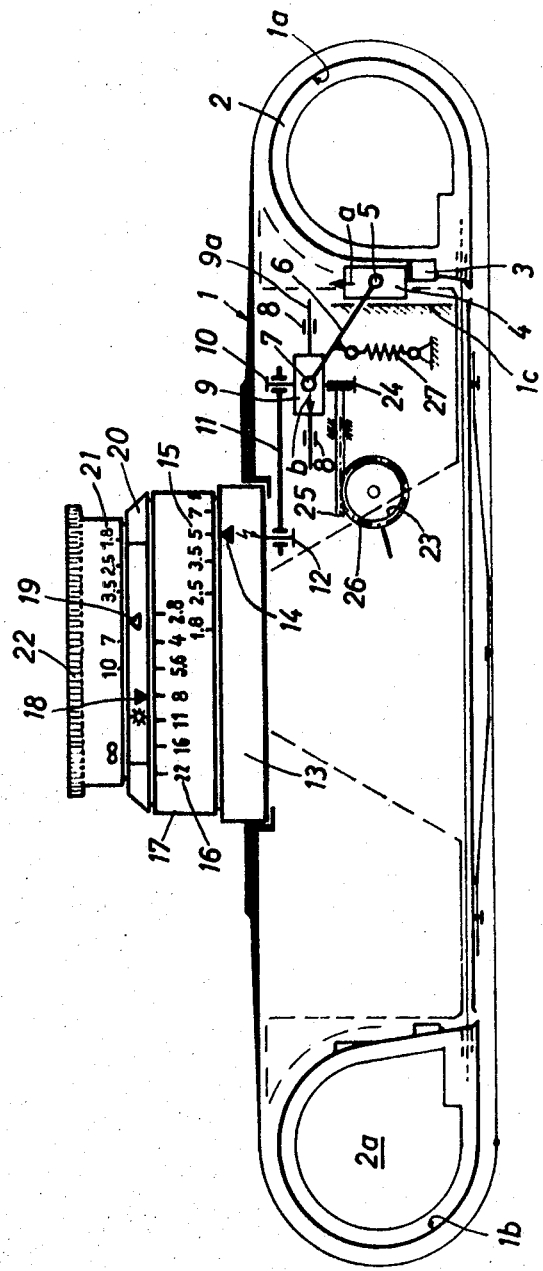
INVENTOR.
GERD KIPER
BY
Michael S. Striker
ATTY 3,470,802
EXPOSURE CONTROL MECHANISM FOR
PHOTOGRAPHIC CAMERAS
Gerd Kiper, Unterhaching, Munich, Germany, assignor to Agfa-Gevaert Aktiengesellschaft, Leverkusen, Germany
Filed Dec. 28, 1966, Ser. No. 605,316
Claims priority, application Germany, Dec. 29, 1965,
A 24,966
Int. Cl. G03b 7/00
U.S. Cl. 95—31                    5 Claims

ABSTRACT OF THE DISCLOSURE

An exposure control mechanism which, when the camera is used for operation with flash, enables the user to select the size of the diaphragm aperture as a function of film sensitivity, selected focal distance, and guide number of the flash unit without knowing the sensitivity of film and/or the guide number of the flash unit. Operative connections between the film supply cartridge and the components of the exposure control mechanism adjust such mechanism in dependency on the sensitivity of film.

---

The present invention relates to photographic cameras in general, and more particularly to improvements in photographic cameras for daylight and flash operation. Still more particularly, the invention relates to improvements in the exposure control mechanism of a photographic camera which is provided with a built-in or detachable flash unit.

It is an important object of the present invention to improve and simplify the operation of the exposure control mechanism in a photographic camera for daylight and flash operation wherein the size of the diaphragm aperture may be selected as a function of the distance from the subject as well as a function of one or more additional factors which influence the quality of exposures with flash.

Another object of the invention is to provide a photographic camera wherein, during operation with flash, the size of the diaphragm aperture can also reflect the sensitivity of film and/or the guide number of the flash unit.

A further object of the invention is to provide a photographic camera which is constructed and assembled in such a way that the user can select an optimum size for the diaphragm aperture without even knowing the sensitivity of film which is being used for making exposures in daylight and/or with flash.

An additional object of the invention is to provide a camera of the just outlined character wherein the user can properly select the size of the aperture even if he or she does not know the guide number of the flash unit which is being used in making exposures with flash.

Still another object of my invention is to provide a simple, compact and inexpensive camera which embodies the above outlined features and which requires little skill for proper selection of exposure values.

Briefly outlined, a feature of the present invention resides in the provision of a photographic camera for operation in daylight or with flash which can be provided with a built-in flash unit or with a separable flash unit. The camera comprises a housing adapted to accommodate a film-containing receptacle which is removable from its chamber and is provided with a marker applied in such a way that its position with reference to the housing (when the receptacle is properly accommodated in its chamber) is indicative of the sensitivity of film in the receptacle, visible indicating means preferably including a ring which is movably supported by the housing (for example, such a ring may be rotated about the optical axis of a still camera), motion transmitting means for selecting the position of the indicating means as a function of the position of the marker with reference to the housing so that the thus selected position of the indicating means also reflects the sensitivity of film in a properly inserted receptacle, and setting means providing a range of exposure values and being manually or automatically adjustable with reference to the housing and with reference to the indicating means to select an exposure value for flash operation as a function of the selected position of the indicating means.

In order to insure satisfactory positioning of setting means in dependency on another factor which influences the quality of exposures with flash, the camera preferably comprises a focus adjusting member which can indicate the distance from the subject, and a distance scale provided on the setting means or on the indicating means to facilitate adjustment of the setting means in dependency on the position of the focus adjusting member. For example, the indicating means may carry an index whose position with reference to such indicating means is indicative of the guide number of the flash unit which is being used for making exposures with flash, and the setting means may comprise a distance scale. By placing the index into registry with that graduation of the distance scale which reflects the position of the focus adjusting member, the operator of the camera will select the size of the aperture as a function of focus adjustment, as a function of sensitivity of the film, and as a function of the guide number of the flash unit.

If desired, the focus adjusting member and the indicating means may constitute two input members of an integrating mechanism whose output member is constituted by the setting means so that changes in position of the focus adjusting member bring about automatic adjustment of the setting means when the camera is ready to make an exposure in artificial light whereby the setting means receives motion not only from the focus adjusting member but also from the indicating means or directly from the marker of a properly inserted receptacle.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of certain specific embodiments with reference to the accompanying drawing.

The single figure of the drawing is a diagrammatic top plan view of a still camera which embodies the invention, certain portions of the camera being shown in section.

Referring to the drawing in detail, there is shown a still camera which comprises a housing 1 having at one end a chamber 1a for a film-containing receptacle or cartridge 2. The other end of the housing 1 has a second chamber 1b for a take-up cartridge 2a. The cartridge 2 has a marker 3 whose position with reference to the housing 1 is indicative of the sensitivity or speed of unexposed film which is stored in the cartridge 2. The marker 3 may be constituted by a shoulder provided externally on the cartridge 2 and positioned in such a way that it can be engaged and tracked by a follower 4 reciprocably mounted in the housing 1 and forming part of a motion transmitting mechanism. In the illustrated embodiment, the motion transmitting mechanism comprises a link train including a link 6 which is articulately connected to the follower 4 by a pivot pin 5 and is also coupled to a reciprocable pusher 9 by means of a second pivot pin 7. The follower 4 is reciprocable in ways 1c provided therefor in the housing 1. The pusher 9 has a pair of guide rods 9a which are reciprocable in ways 8 and further comprises a post 10 which is articulately connected to one end of a second link 11. The other end of the link 11 is coupled to a post 12 provided on a ring-shaped indicating member 13 which is rotatable in the housing 1 about the optical axis of the objective and carries an index 14 adjacent to a thunderbolt signal. A helical spring 27 operates between the link 6 and housing 1 to maintain the follower 4 in abutment with the marker 3. It will be seen that the angular position of the indicating ring 13 and its index 14 is a function of the sensitivity of film in the supply cartridge 2 because such angular position will change if the cartridge 2 is replaced by a cartridge having a different marker permitting the follower 4 to move downwardly or compelling the follower to move upwardly with reference to the position shown in the drawing.

The mounting of the indicating ring 13 is such that at least a portion thereof (including the index 14) extends from the housing 1 and can be observed by the user of the camera. The index 14 cooperates with a graduated distance scale 15 provided on an exposure value setting ring 17 which is concentric with and is rotatable relative to the ring 13. In the illustrated embodiment, the ring 17 is arranged to provide a range of exposure apertures and carries a second scale 16 which is calibrated to indicate different sizes of the aperture. This scale 16 cooperates with an index 18 provided on a stationary ring 20 of the objective mount. The index 18 is adjacent to a symbol representing the sun to point out to the user that he can arbitrarily select the size of the aperture when the camera is used in daylight. For exposures with flash, the user will refer to the thunderbolt symbol and will know that the ring 17 should be adjusted with reference to the indicating ring 13.

The stationary ring 20 is provided with a further index 19 which cooperates with a graduated distance scale 21 provided on a rotary focus adjusting ring 22. The graduations on the scale 21 are the same as those on the scale 15.

The camera further comprises a built-in exposure meter including a moving coil instrument 23 whose housing is rotatable about a vertical axis to assume a selected initial position as a function of the sensitivity of film in the cartridge 2. In order to insure automatic selection of the initial position of the instrument 23, the motion transmitting mechanism which selects the position of the indicating ring 13 is operatively connected with the housing of the instrument 23 by a rack-and-pinion drive. This drive includes a pinion 26 on the housing of the moving coil instrument 23, an elongated rack 25 which meshes with the pinion 26 and is guided in ways provided therefor in the housing 1, and a post 24 which couples one end of the rack 25 to the pusher 9. The just described rack-and-pinion drive constitutes but one of several types of operative connections which may be utilized to select the initial whereon the position of the marker 3 reflects the sensitivity of film in the supply cartridge 2.

When the operator inserts a fresh supply cartridge 2 whereon the position of the market 3 reflects the sensitivity of unexposed film, the marker 3 will assume a predetermined position with reference to the housing 1 as soon as the cartridge 2 is properly accommodated in its chamber 1a. The marker 3 displaces the follower 4 of the motion transmitting mechanism whereby the post 12 changes the angular position of the indicating ring 13 so that the position of the index 14 reflects the sensitivity of film in the cartridge 2. At the same time, the pusher 9 changes the initial angular position of the exposure meter 23 so that such initial position is also a function of film sensitivity. The direction of displacement of the follower 4 against the opposition of spring 27 is indicated by arrow a. Any such displacement of the follower 4 will cause the pusher 9 to move in the direction of arrow b.

If the operator then wishes to make an exposure with flash, he turns the focus adjusting ring 22 until the index 19 registers with that graduation of the scale 21 which is indicative of the true distance from the subject. The setting ring 17 is thereupon rotated by hand to place the index 14 into registry with that graduation of the scale 15 which corresponds to the graduation singled out by the index 19. The size of the aperture is then selected as a function of the focal distance and film sensitivity. The position of the index 14 on the indicating ring 13 reflects the guide number of the flash unit which is being used in connection with or is built into the camera. Thus, by placing the index 14 into registry with that graduation of the scale 15 which indicates the selected position of the focus adjusting ring 22, the operator of the camera will make an exposure with flash by considering the guide number of the flash unit, the sensitivity of film in the supply cartridge 2, and the focal distance. The construction of the camera is particularly simple if it is used with a flash unit whose light output is constant. In such a camera, the indicating ring 13 carries a single index 14. If the camera is used with flash units having different guide numbers or with a flash unit whose light output can be varied, the ring 13 will be provided with two or more indices 14 each of which will be indicative of a different guide number.

When the camera of my invention is used for operation in daylight, the setting ring 17 will be adjusted by hand to place the index 18 of the stationary ring 20 into registry with a selected graduation on the scale 16. Such adjustment can be carried out automatically if the exposure meter 23 is properly coupled with the ring 17 when the camera is used in daylight.

The improved camera is susceptible of many additional modifications without departing from the spirit of my invention. For example, the motion transmitting mechanism which connects the follower 4 with the indicating ring 13 may be replaced by a different motion transmitting mechanism which can be constituted by a simpler or more complicated link train. Furthermore, the focus adjusting ring 22 can be connected with the setting ring 17 by a suitable integrating mechanism which is operative when the camera is used for operation with flash. Such integrating mechanism will have two input members one of which is constituted by the focus adjusting ring 22 and the other of which influences the position of the ring 17 as a function of the sensitivity of film in the supply cartridge 2. Integrating mechanisms with two input members are known in the art and, therefore, this modification is not specifically shown in the drawing.

The position of the index 14 and scale 15 can be reversed. The same applies for the indices 18, 19 and scales 16, 21.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. A photographic camera for operation in daylight and for operation with sources of artificial light having different guide numbers, comprising a housing; a film-containing receptacle removably received in said housing and having marker means whose position with reference to said housing is indicative of the sensitivity of film in said receptacle; indicating means movably supported by said housing; motion transmitting means for selecting the position of said indicating means as a function of the position of said marker means so that the selected position of said indicating means reflects the sensitivity of film in said receptacle; setting means providing a range of exposure values, said setting means being adjustable with reference to said housing and said indicating means to select an exposure value for operation with a flash unit with a given guide number as a function of the selected position of said indicating means; an index member including a plurality of indices, each representing a different guide number; a graduated distance scale member, one of said members being provided on said indicating means and the other member being provided on said setting means; focus adjusting means; and means for pointing out the distance from the subject, said setting means being adjustable to place that graduation of said scale member which corresponds to the distance from this subject into registry with that one of said indices which is indicative of the guide number of the employed source of artificial light.

2. A photographic camera for daylight and flash operation, comprising a housing; a film-containing receptacle removably received in said housing and having marker means whose position with reference to said housing is indicative of the sensitivity of film in said receptacle; adjustable exposure meter means; indicating means movably supported by said housing; and a motion transmitting connection including a reciprocable tracking member engaging said marker means, a reciprocable motion transmitting member, first linkage means connecting said tracking member with said motion transmitting member for reciprocating the latter in response to displacement of said tracking member, second linkage means connecting said motion transmitting member with said indicating means for selecting the position of said indicatig means as a function of the position of said marker means so that the selected position of said indicating means reflects the sensitivity of film in said receptacle, and third linkage means connecting said motion transmitting member with said exposure meter means to adjust said exposure meter means as a function of the position of said marker means.

3. A photographic camera as defined in claim 2, wherein said indicating means is rotatable about the optical axis.

4. A photographic camera as defined in claim 2, wherein one of said linkage means comprises a rack and pinion drive.

5. A photographic camera as defined in claim 2, further comprising means for biasing said tracking member against said marker means.

References Cited

UNITED STATES PATENTS

| | | | |
|---|---|---|---|
| 3,054,338 | 9/1962 | Ewald et al. | 95—45 |
| 3,260,182 | 7/1966 | Nerwin | 95—31 |
| 3,266,398 | 8/1966 | Kremp et al. | 95—31 |
| 3,364,831 | 1/1968 | Kremp et al. | 95—31 |
| 3,386,357 | 6/1968 | Kremp et al. | 95—10 |

FOREIGN PATENTS

| | | |
|---|---|---|
| 39,966 | 6/1965 | Germany. |
| 51,118 | 10/1966 | Germany. |

OTHER REFERENCES

"Built-in Brain," Oct. 4, 1967, pp. 6–9.

NORTON ANSHER, Primary Examiner

DAVID S. STALLARD, Assistant Examiner